UNITED STATES PATENT OFFICE.

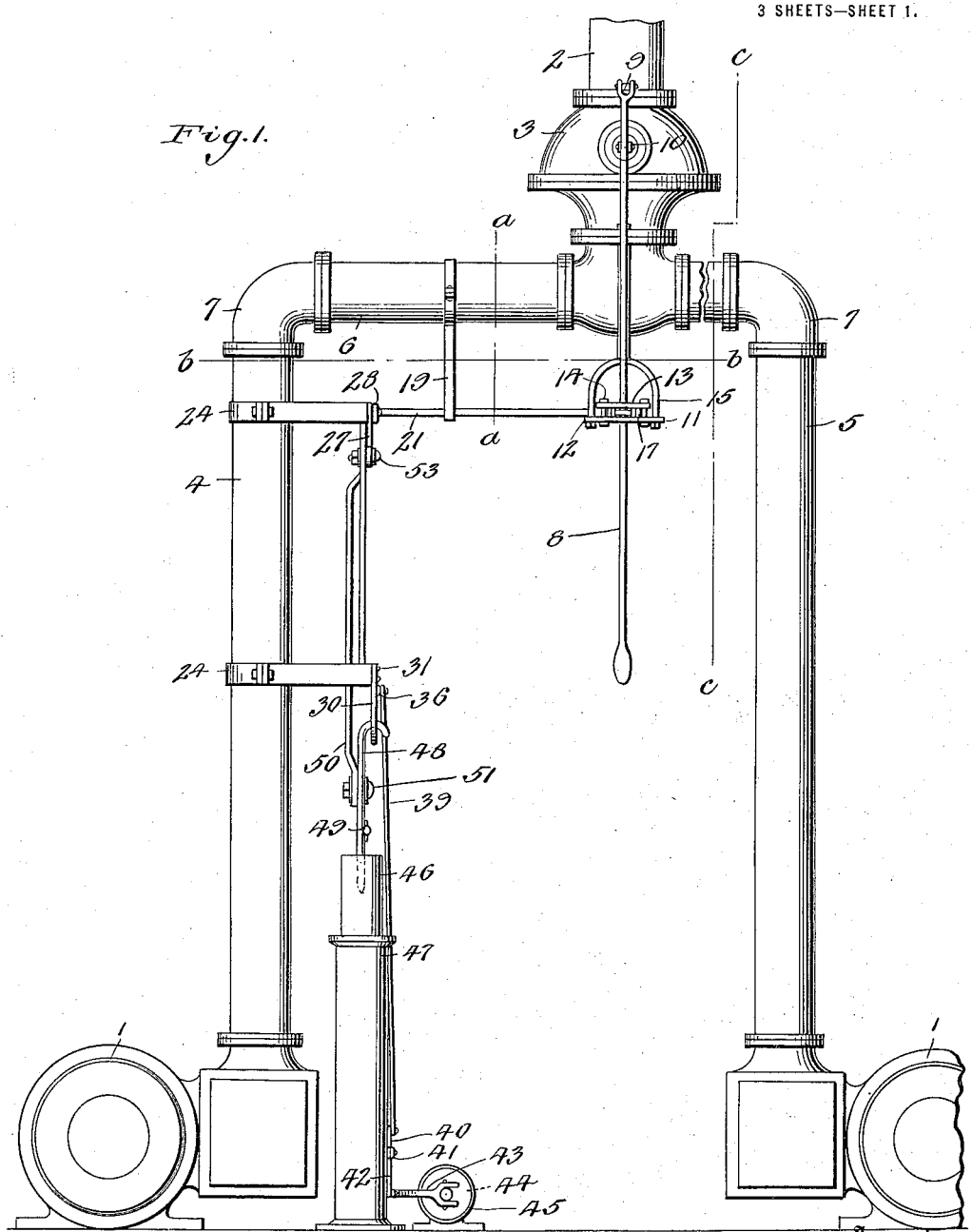

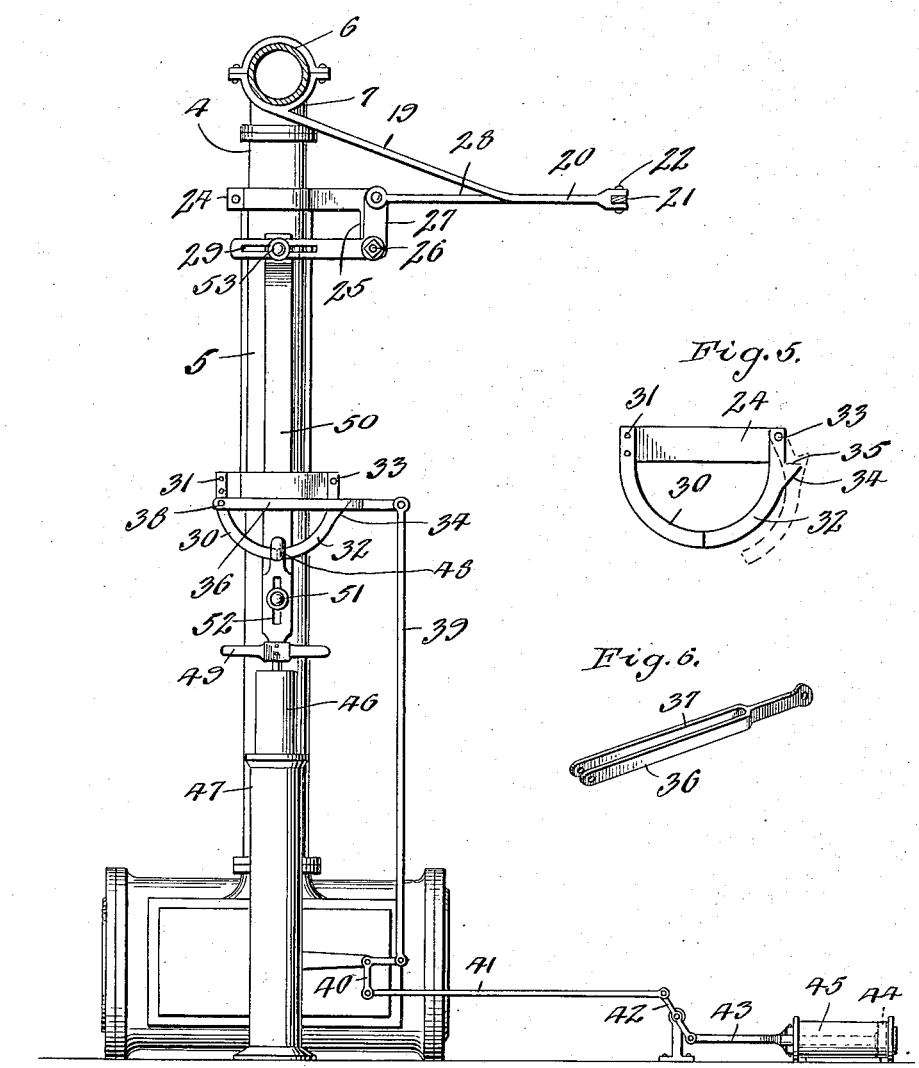

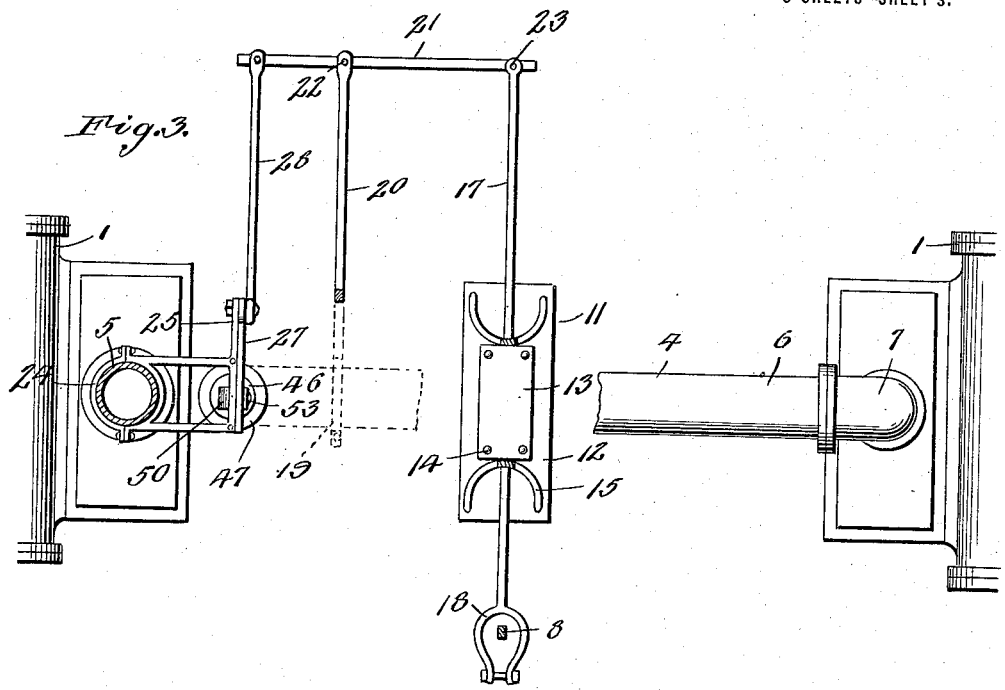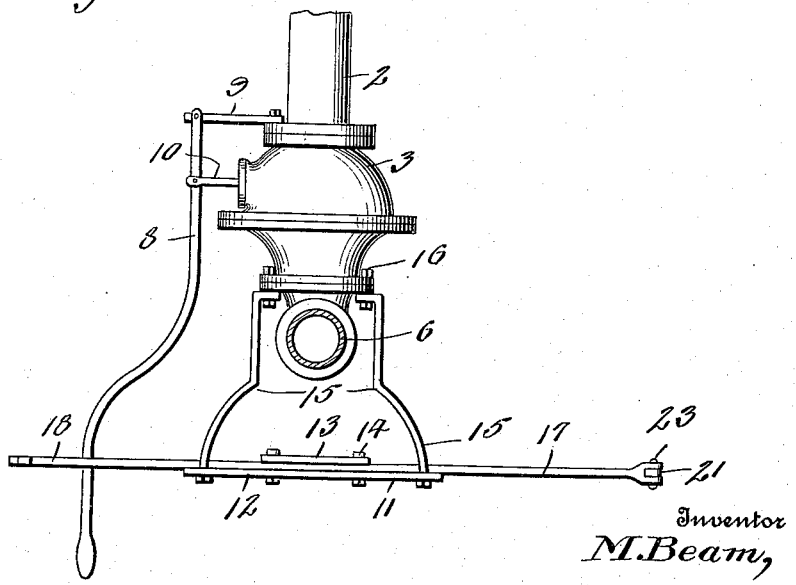

MATHEW BEAM, OF OLD FORGE, PENNSYLVANIA.

OVERHOIST AUTOMATIC CUT-OFF.

1,156,877.  Specification of Letters Patent.  Patented Oct. 19, 1915.

Application filed February 4, 1914. Serial No. 816,592.

*To all whom it may concern:*

Be it known that I, MATHEW BEAM, a citizen of the United States, residing at Old Forge, in the county of Lackawanna and State of Pennsylvania, have invented new and useful Improvements in Overhoist Automatic Cut-Offs, of which the following is a specification.

This invention is an improved overhoist automatic cutoff apparatus for use in connection with a steam engine to operate the throttle valve and cause the latter to shut off steam to the engine and thereby cause the latter to stop, in the event of any emergency such as the loss of control of the engine by the engineer, or by his neglect, absence, illness or death while the engine is in operation, and to prevent accident or damage by the continuous operation of the engine, such for instance as to prevent an elevator cage in use in a mining shaft from going into the sheave wheels in the tower or to stop the cage or cages in case the speed of the engines or cages is excessive, or for use in connection with engines which operate pumps to cause the engine to automatically stop when the water reaches a certain level and to cause the engine to continue its operation upon a change of the water level, the object of the invention being to provide an improved cutoff mechanism of this class which operates automatically and which serves to control the operation of a steam or other engine and prevent unnecessary or undesirable operation thereof.

The invention consists in the construction, combination and arrangement of devices hereinafter described and claimed.

In the accompanying drawings: Figure 1 is an end elevation of an overhoist of an automatic cutoff constructed in accordance with my invention and arranged for use on the steam pipe of an engine. Fig. 2 is a side elevation of the same, the steam pipe being shown in section, on the plane indicated by the line *a—a* of Fig. 1 and the actuating cylinder being also indicated partly in section. Fig. 3 is a plan view of the same with the steam pipe and attachments in section on the plane indicated by the line *b—b* of Fig. 1. Fig. 4 is a detail vertical sectional view, taken on the plane indicated by the line *c—c* of Fig. 1. Fig. 5 is a detail elevation of the hanger and dog, and of the bracket to which they are attached. Fig. 6 is a detail perspective view of the trip arm.

For the purposes of this specification the cylinders of a steam engine are indicated at 1 and the steam pipe at 2, provided with a throttle valve the casing of which is indicated at 3, branch steam pipes 4 leading from the throttle valve to the steam chests of the engines, each branch steam pipe comprising a vertical member 5 and a horizontal member 6 connected to the vertical member by an elbow 7. The throttle valve operating lever is indicated at 8 and is arranged vertically, its upper end being fulcrumed to a bracket 9 and the throttle valve steam pipe connected to the said lever being indicated at 10.

In accordance with my invention I provide a horizontally arranged supporting guide 11 which comprises a lower plate 12, an upper plate 13 and bolts 14 which connect the said plates together and in spaced relation. The plate 11 is attached to the lower ends of a pair of brackets 15, the upper ends of the brackets being here shown as attached by bolts 16 to the coupling between the steam pipe member 6 and the casing of the throttle valve. These brackets serve to support the supporting guide at a point below the throttle valve. A longitudinally movable throttle valve lever operating rod 17 is arranged and supported and guided by the plates 12—13 and the bolts 14 and is provided at one end with a fork 18 which forms a slot through which the lower portion of the throttle lever 8 extends so that the said throttle lever is loosely connected to the said rod 17, thus enabling the throttle lever to be operated manually, and also adapting it to be operated automatically by the rod 17 as hereinafter more fully set forth.

A hanger bracket 19 is attached to and dependent from one of the horizontal steam pipe members 6. This bracket has at its lower end a horizontally arranged forked arm 20 in which a lever 21 is fulcrumed as at 22, the said lever being pivotally connected to one end of the rod 17 as at 23. A pair of brackets 24 are secured, one above the other, to one of the vertical steam pipe members 5. The upper bracket 24 has an L-shaped arm 25 to which is pivoted, as at 26, a bell crank lever 27, one arm of said lever being connected by a link 28 to the lever 21 and the other arm of the same bell crank lever being provided with a slot 29.

A quadrant shaped hanger 30 has its upper end fixedly bolted to the lower bracket 24 as at 31 the lower portion of said hanger forming a quarter circular arm. A similarly shaped dog 32, which is arranged reversely with respect to the hanger 30 has its upper end pivoted as at 33. To the said lower bracket 24 and this dog is provided on its outer side with an inclined cam face 34, above which is a shoulder 35. The lower end of this dog is adapted to close against the lower end of the hanger 30. A trip arm 36 has a forked portion 37 which is arranged astride of the hanger 30 and the dog and is pivoted to the said hanger as at 38. The crotch of the forked portion of the trip arm 36, when said trip arm is in normal position bears against the cam face 34 of the dog and serves to keep the latter in closed position with respect to the hanger 30 but when said trip arm is raised at points above the said cam and the shoulder of the dog clears the trip arm and permits the dog by its own gravity to swing outwardly away from the hanger 30. This trip arm is attached to the upper end of a rod 39 the lower end of which is attached to one arm of a bell crank 40. The other arm of said bell crank is connected by a rod 41 to the upper end of a rocker link 42, the lower end of the said rocker link being connected to the rod 43 of a piston 44 which operates in an actuating cylinder 45. Any suitable mechanism may be employed in connection with the actuating cylinder to supply the latter with steam under pressure in the event of an overwind.

A weight 46 is arranged for vertical movement in a guide 47, which is here shown as a vertically arranged cylinder. A hook 48 is attached to the upper end of and extends upwardly from the weight and which is adapted to be engaged by the hanger 30 and the dog 32 and by them held so as to cause the hook to automatically support the weight in an elevated position. A cross arm 49 is attached to the shank of the hook to enable the weight to be manually raised and lowered and the hook engaged with the hanger and dog. A link 50 has its lower end pivotally connected by a bolt 51 to the hook, the shank of the hook being provided with a vertical adjusting slot 52 through which the bolt 51 passes. The upper end of the said link is pivotally connected by a bolt 53 to the slotted arm of the bell crank lever 27 the said bolt being adjustable in the slot of the said bell crank arm.

The operation of my invention is as follows: In the event of an overwind the piston in the actuating cylinder 45 is operated and the piston rod, through the instrumentality of the parts 39—40, 41—42 raises the free end of the trip arm 36 thus causing the said trip arm to move upwardly above the cam 34 and release the dog 32. The dog then swings outwardly by its own gravity and under the influence of the weight 46 which is suspended therefrom, thus disengaging the hook 48 and thereupon the weight drops. The link 50 causes the bell crank lever 27 to turn and this bell crank lever drawn endwise on the rod 28, causing said rod to move the lever 21 and said lever moves the rod 17 in one direction so that the slot of said rod causes the throttle lever 8 to be operated and to close the throttle valve and thus shut off the supply of steam to the engine, thus causing the latter to stop. Before the engine can be started again the weight 46 must be manually raised and the hook 48 reëngaged by the dog 32. Where the engine operates a pump or the like device the actuating mechanism or releasing mechanism for the dog 32 may be operated by a float when a proper level is reached. Any suitable actuating mechanism may be employed for releasing the dog within the scope of my invention.

Having thus described my invention, I claim:—

1. In overhoist cutoff mechanism of the class described the combination of an endwise movable element for operating a throttle valve lever, a supporting guide for said endwise moving element, a lever to which said element is connected, a bell crank lever connected to the first-named lever to operate the same, a weight, means including a dog to support the weight in raised position, and a link connecting said weight to the bell crank lever.

2. In overhoist cutoff mechanism of the class described the combination of an endwise movable element for operating a throttle valve lever, a supporting guide for said endwise moving element, a lever to which said element is connected, a bell crank lever connected to the first-named lever to operate the same, a weight, means including a dog to support the weight in raised position, a link connecting said weight to the bell crank lever, said link being adjustably connected to said bell crank lever to vary the throw of the latter, a trip element to release the dog and an actuating mechanism to automatically operate the trip element.

In testimony whereof I affix my signature in presence of two witnesses.

MATHEW BEAM.

Witnesses:
SAMUEL BRODHEAD,
M. D. BRODHEAD,